United States Patent Office

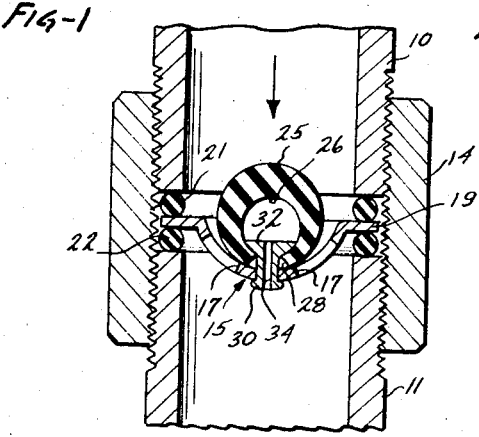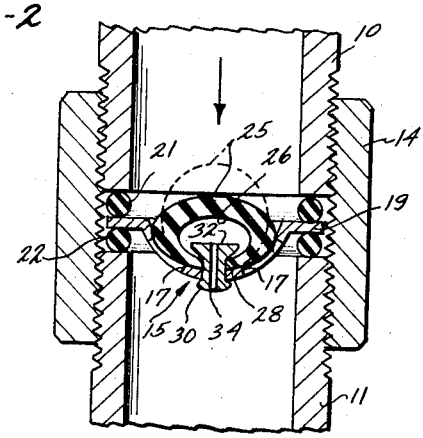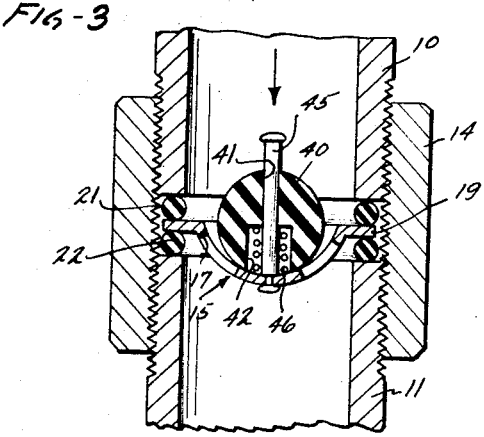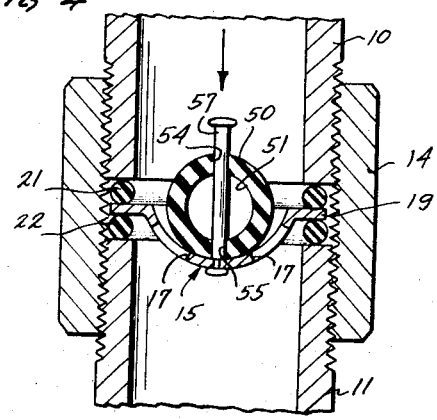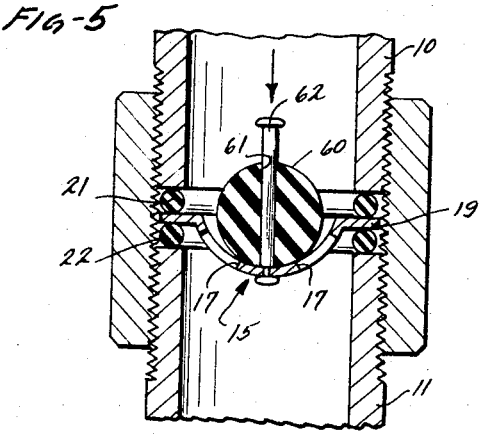

3,367,363
Patented Feb. 6, 1968

3,367,363
FLUID FLOW CONTROL DEVICE
Allan C. Hoffman, 2891 Rumsey Drive,
Riverside, Calif. 92506
Continuation-in-part of application Ser. No. 439,605,
Mar. 15, 1965. This application Oct. 24, 1965, Ser.
No. 504,857
13 Claims. (Cl. 137—517)

This invention relates to a unique fluid flow control device of simplified construction, but yet being very positive and effective in operation.

This application is a continuation-in-part of application, Ser. No. 439,605, filed Mar. 15, 1965, and entitled, "Fluid Flow Control Device."

The flow control device of this invention embodies improvements over that of the previous application. The flow control device of this invention has many and varied applications wherever a valve or flow control device is needed to control the flow of a fluid whether liquid or gas.

Simplified flow control deices have been proposed in the past. Once such proposal uses a deformable washer with a hole through the center seating against chamfered shoulder in a pipe to form a control valve. Upon increasing pressure, the pressure forces the washer against the shoulder tending to squash it and to thereby make smaller the hole through the washer. Such a device is subject to certain deficiencies, one of which is if the pressure gets high enough, it will blow the washer through the hole. Also, the recovery from deformation is relatively slow. The design flexibility is limited.

The area of a circular opening varies as the second power of the radius. Thus, in the device just referred to, as the effective pressure differential increases, the size of the hole is reduced in accordance with the second power of the radius, and the versatility as respects control characteristics that can be designed is proportionally limited. In the device of this invention, a deformable member is used which increases in effective control area as the pressure differential increases. Thus, by reason of the area varying as the second power of the radius, the device takes full advantage of this relationship and makes possible considerably greater versatility as respects designing particularly desired control characteristic curves. The realization of this purpose is one of the primary objectives and advantages of the invention.

In a preferred form of the invention, an orifice member is provided in combination with a deformable member which is deformed by the fluid pressure differential in a manner to regulate the area of the orifice or orifices in the orifice member exposed to fluid flow. In a preferred form of the invention, the orifice member is made genera' ly hemispherical, although it may also be made spherical, and the deformable member is made as a generally spherical member having a cavity within it. Various patterns of orifices may be provided in the orifice member. The cavity within the deformable member may be spherical having the same center as the generally spherical deformable member, or it may have a center which is eccentric with respect to the center of the deformable member. These improvements provide a number of distinct advantages. One of these in particular is that the range of deformability of the deformable member can be greatly increased thereby propotrionally increasing the versatility of the device as respects the designing of desired control characteristic curves. Realization of this objective is further assisted by the fact that the size and position of the cavity in the deformable member can be varied thereby providing means for controlling the degree and characteristics of the deformation. Particularly, the rate of change of controlling effect, i.e., area of effective flow passage, can be controlled with considerably gerater facility and versatility. Where the effective flow area is decreased as the effective blocking area of the deformable member is increased, it can be seen that full advantage is taken of the greater rate of change which follows from the fact that the change in area is proportional to the second power of the radius.

When a solid ball is used as the deformable member, this places some limitations on the versatility of the device since the deformability cannot exceed that which is possessed by the softest rubber or other material that can be used. The use of a deformable member with a cavity therein, as can readily be observed, greatly increases the range of deformability of the member.

In a preferred form of the invention, the deformable member is attached to the orifice means by a stem or rivet so that a single unitary assembly is realized, this being one of the objectives of the invention.

As indicated in the foregoing, the invention has applicability over a wide range, including virtually any situation in which a valve or control device is used, and the device can be readily constructed in any size. The deformable member may be made of rubber having the maximum qualities and characteristics as respects strength etc.

Further objects and additional advantages of the invention will become apparent from the following detailed description and annexed drawings, wherein:

FIG. 1 is a cross-sectional view of a preferred form of the invention under conditions of zero or substantially zero pressure differentials;

FIG. 2 is a cross-sectional view of the device of FIG. 1 with a pressure differential across the flow control device;

FIG. 3 is a cross-sectional view of a modified form of the invention;

FIG. 4 is a cross-sectional view of a further modified form of the invention; and FIG. 5 is a cross-sectional view of a further modified form of the invention.

Referring now more in detail to FIGS. 1 and 2 of the drawings, numeral 10 designates the end of a tube or pipe which is threaded at the end. Numeral 11 designates the end part of another tube or pipe threaded at the end. The parts 10 and 11 may be parts of a fitting or coupling. Numeral 14 designates an internally threaded sleeve shown coupling the tube ends 10 and 11 together. The ends of the tubes 10 and 11 are spaced as shown. Numeral 15 designates an orifice member which in a preferred form of the invention is generally hemispherical having spaced orifices 17 in it, as shown. It has a peripheral flange 19 which is positioned between sealing O-rings 21 and 22, being positioned between the ends of the tubes 10 and 11 which may be drawn together by the sleeve 14 to compress the O-rings 21 and 22 against the flange 19. The figures illustrate an exemplary manner of sealing the orifice member. It, of course, may be sealed between a male fitting and a female fitting threaded together, using one or more O-rings.

Cooperating with the orifice member 15 is a deformable generally spherical ball or element 25 which is preferably made of rubber or a comparable resilient material. In a prefered form of the invention, ball or deformable member 25 has a radius slightly less than the radius of curvature of the orifice member 15. Any number of orifices 17 may be provided and these orifices may be circular or may have other shapes, and may be arranged in different patterns to provide a variety of control characteristics. In one exemplary form of the invention, the ball has a diameter which is 7/10 the diameter of the orifice member. The ball 25 has a central cavity 26 which in the preferred form of the invention is generally spherical having a center which is eccentric with respect to the center of the ball 25. The cavity 26 might, of course, have a center to coincide with the center of the ball 25. The ball 25 has a side opening 28 communicating with the cavity 26. The ball 25 is attached to the center part of the orifice plate 15 by means of a rivet 30 which extends through the opening 28 and through the center part of the orifice plate 15. The rivet 30 has a slightly enlarged head 32 larger than the size of the opening 28. The ball 25 has sufficient flexibility that the opening 28 can be manually fitted over the head 32 of the rivet 30 and can be manually removed therefrom. Figuratively, the ball member 25 can be buttoned on to the rivet and unbuttoned therefrom manually. Preferably, the rivet 32 has a central bore 34 so that when the device is used for controlling liquid, the liquid cannot become entrapped within the cavity 26. Since liquids are incompressible, if the liquid were allowed to remain in the cavity 26, this would interfere with the desired control effect of the ball 25.

In operation, the pressure of fluid passing through the device creates a differential resulting in the ball 25 being urged against the orifice member 15 tending to compress the ball and to deform it, as shown in FIG. 2. As it deforms, it progressively closes off the orifices 17 thereby exerting a proportional control effect. The device provides great versatility as respects the designing of the device to achieve particular desired characteristic control curves. The high degree of deformability of the ball 25 contributes to this result. As will be noted, the thickness of the walls of the ball 25 varies when the cavity 26 is eccentric, and thus control of the desired characteristic can further be effected by varying the degree of eccentricity and thereby varying the thickness of the wall of the ball 25 at different angular positions. The device may be designed to exert a regulating or control effect on the flow of fluid whereby to maintain a constant or relatively constant rate of flow, or it can be designed to produce any desired characteristics control curve. The results are realized automatically without other parts than the orifice member and the ball 25, which are preferably attached together. As will be observed, the device is extremely simple, being made of very simple parts which are easy to fabricate and install in the manner described. In addition to the characteristics and advantages referred to in the foregoing, the ratio of the diameter of the ball and the orifice member can be varied to exert a comparable variation on the control characteristic obtained. The physical properties of the deformable member 25 can be selected as to strength, hardness, etc., whereby to realize any desired characteristic in the device as a whole. The size, shape, location and number of the orifices in the orifice member can be varied to the end that the designer has a very wide choice of variations to select from for the purpose of precisely realizing any particular characteristic control curve.

FIG. 3 shows a modified form of the invention in which similar parts are similarly numbered. In this form of the invention, the deformable member is a generally spherical ball 40 having a bore 41 through it and a larger counterbore 42. A pin 45 extends through the bore 41 and through the center of the orifice plate 15 whereby the deformable member is secured to the orifice means. Within the counterbore 42 is a coil spring 46 around the stem 45 which has a head on each end. In this form of the invention, the spring 46 must begin to compress before the deformable member 40 can begin to control the flow through the device. That is, in this device the structure is such as to provide a means whereby control will begin at a predetermined pressure differential. The deformable member or ball 40 may move along the stem 45 to its upper end when there is no pressure differential across the device.

FIG. 4 shows another modified form of the invention in which similar parts are similarly numbered. In this form of the invention, the deformable member is in the form of a generally spherical ball 50 having a cavity 51 which has a center coincident with the center of the ball 50. Thus, the thickness of the wall of the ball 50 is uniform. The ball 50 has diametrically opposed bores through its walls, as designated at 54, and 55. Extending entirely through the ball is a stem or pin member 57, one end of which extends through the center part of the orifice member 50, the stem having heads on both ends as shown. When there is no pressure differential, the ball 50 may move along the stem 57 to its upper end. This form of the invention provides a unitary structure or assembly having control characteristics governed by factors similar to those of the previous embodiment and particularly that the thickness of the walls of the deformable member 50 is uniform.

FIG. 5 shows another form of the invention in which similar parts are similarly numbered. In this form of the invention, the deformable member is in the form of a solid ball 60 made of rubber or comparable material having a center bore 61 extending through it. Extending through the bore 61 is a pin or stem 62, one end of which extends through the center of the orifice member 15, the stem 62 having heads on both ends. Under conditions of no pressure differential, the deformable member 60 may move upwardly to the upper end of stem 62. This modification provides a unitary structure or assembly using a solid ball as the control element. Its characteristics are similar to those of the previous embodiment, the differences being those attendant to the use of a solid ball rather than one having a cavity within it.

From the foregoing, those skilled in the art will observe that the invention achieves and realizes all of the objects and advantages as set forth in the foregoing as well as having many additional advantages that are apparent from the detailed description.

The foregoing disclosure is representative of preferred forms of the invention and is to be interpreted in an illustrative rather than a limiting sense, the invention to be accorded the full scope of the claims appended hereto.

I claim:

1. A flow control device for use in a passageway comprising a member having orifice means, the said member including at least a portion providing a surface which is a portion of a sphere, a deformable, generally spherical ball member positioned adacent to the orifice means, the diameter of the ball being less than that of the spherical portion of the orifice member, the interior surface of the spherical part of the orifice member being unobstructed so that the ball engages the said surface in tangential relationship, the deformable member being deformable in response to fluid pressure whereby to cooperate with the orifice member to exercise control of the flow of fluid through the device as the deformable member deforms in cooperation with the orifice means, and means securing the ball members to the orifice member.

2. A flow control device as in claim 1 wherein said means attaching the ball to the orifice member comprises a stem extending through the orifiice member and through at least a part of the ball member.

3. A flow control device as in claim 1 wherein the said ball has a cavity inside of it.

4. A flow control device as in claim 2 wherein said stem extends entirely through the said ball member.

5. A flow control device as in claim 3 wherein the said stem extends through only one side wall of the ball.

6. A flow control device as in claim 2 wherein the ball is solid rather than being hollow.

7. A flow control device as in claim 4 including a spring positioned to urge the ball away from the orifice member.

8. A flow control device as in claim 3 having a spring being positioned in the cavity with a stem extending through the spring, for attaching the ball to the orifiice member.

9. A flow control device for use in a passageway comprising a member having orifice means, the said member including at least a portion providing a surface which is a portion of sphere, a deformable, generally spherical ball member positioned adjacent to the orifice means, the diameter of the ball being less than that of the spherical portion of the orifice member and having a cavity within it, the interior surface of the spherical part of the orifice member being unobstructed so that the ball engages the said surface in tangential relationship, the deformable member being deformable in response to fluid pressure whereby to cooperate with the orifice member to exercise control of the flow of fluid through the device as the deformable member deforms in cooperation with the orifice means.

10. A flow control device as in claim 9 including means attaching the ball to the orifice member.

11. A flow control device as in claim 10 wherein said means attaching the ball to the orifice member comprises a stem extending through the orifice member and through at least a part of the ball member.

12. A flow control device as in claim 11 wherein the said stem extends entirely through the ball member.

13. A flow control device comprising a deformable hollow ball, circular means having surfaces to be engaged by the ball, said surfaces having orifice means spaced from the axis of the surfaces adapted to be variably blocked by deformation of the ball against the said surfaces.

References Cited

UNITED STATES PATENTS

| 467,883 | 1/1892 | Haythorn | 137—519.5 |
| 1,211,283 | 1/1917 | Butler | 137—533.13 |
| 1,606,206 | 11/1926 | Boynton | 137—525 |
| 2,497,906 | 2/1950 | Peters | 137—525 |
| 2,777,464 | 1/1957 | Mosely | 137—525 X |
| 2,853,264 | 9/1958 | Lodge | 251—120 |
| 563,371 | 7/1896 | Gold | 137—539 |
| 2,286,841 | 6/1942 | Smith | 137—539 |

ALAN COHAN, *Primary Examiner.*

W. H. WRIGHT, *Assistant Examiner.*